(12) United States Patent
Kouda

(10) Patent No.: US 10,104,160 B2
(45) Date of Patent: Oct. 16, 2018

(54) MEDICAL IMAGE CAPTURING SYSTEM

(71) Applicant: KONICA MINOLTA, INC., Chiyoda-ku, Tokyo (JP)

(72) Inventor: Youko Kouda, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 786 days.

(21) Appl. No.: 14/089,585

(22) Filed: Nov. 25, 2013

(65) Prior Publication Data

US 2014/0188984 A1 Jul. 3, 2014

(30) Foreign Application Priority Data

Dec. 27, 2012 (JP) .................................. 2012-283811

(51) Int. Cl.
*H04L 29/08* (2006.01)
(52) U.S. Cl.
CPC .......... *H04L 67/10* (2013.01); *H04L 67/1095* (2013.01)
(58) Field of Classification Search
CPC .. G06F 19/321; G06F 19/322; G06F 19/3406; G06F 19/3487; G06F 19/3418; G06F 3/14; G06F 2209/541; G06F 3/04842; G06F 3/0488; G06Q 50/24; G06Q 10/101; H04L 67/42; G06T 2207/30004; G06T 2207/10116; A61B 5/743; A61B 2576/00; A61B 6/00; A61B 6/5247; A61B 8/5261; A61B 90/37; H04N 2201/0079; H04N 5/32
See application file for complete search history.

(56) References Cited

U.S. PATENT DOCUMENTS 5,928,335 A * 7/1999 Morita .................... G06F 9/465 709/203
6,067,571 A * 5/2000 Igarashi .................. H04L 29/06 348/14.1
9,507,486 B1 * 11/2016 Reed ...................... G06F 3/0481
(Continued)

FOREIGN PATENT DOCUMENTS

| JP | 2010-124943 A | 6/2010 |
|----|---------------|--------|
| JP | 2011022772 A | 2/2011 |
| WO | 2005096944 A1 | 10/2005 |

OTHER PUBLICATIONS

Japanese Office Action (and English translation thereof) dated Sep. 20, 2016, issued in counterpart Japanese Application No. 2012-283811.

*Primary Examiner* — Ninos Donabed
(74) *Attorney, Agent, or Firm* — Holtz, Holtz & Volek PC

(57) ABSTRACT

A medical image capturing system includes, a server apparatus, and a plurality of client terminals and an image generating apparatus which are connected to the server apparatus to be able to communicate data. The server apparatus includes a display control section, an image management section, and a storage section. The image management section takes in a medical image generated by the image generating apparatus and provides the medical image to the client terminal. The storage section stores a combination of a parent client terminal and a child client terminal set in advance. When there is access from the child client terminal, the display control section provides data of an operation screen which is the same as the parent client terminal to the child client terminal.

8 Claims, 14 Drawing Sheets

(56) References Cited

U.S. PATENT DOCUMENTS

| | | | | |
|---|---|---|---|---|
| 2002/0016718 A1* | 2/2002 | Rothschild | ............ | G06F 19/321 |
| | | | | 705/2 |
| 2002/0019751 A1* | 2/2002 | Rothschild | ............ | G06F 19/321 |
| | | | | 705/3 |
| 2002/0029264 A1* | 3/2002 | Ogino | .................... | G06F 19/321 |
| | | | | 709/223 |
| 2003/0126279 A1* | 7/2003 | Hu | ......................... | G06F 19/321 |
| | | | | 709/233 |
| 2004/0240752 A1* | 12/2004 | Dobbs | ................ | H04N 7/17318 |
| | | | | 382/276 |
| 2007/0109402 A1* | 5/2007 | Niwa | .................... | A61B 5/0002 |
| | | | | 348/77 |
| 2007/0203745 A1* | 8/2007 | Bartsch | .................. | G06Q 10/10 |
| | | | | 705/2 |
| 2008/0049901 A1 | 2/2008 | Tamakoshi | | |
| 2008/0106374 A1* | 5/2008 | Sharbaugh | ............ | G06F 19/327 |
| | | | | 340/5.8 |
| 2010/0066802 A1* | 3/2010 | Dross | ...................... | H04N 7/185 |
| | | | | 348/14.02 |
| 2010/0150311 A1* | 6/2010 | Takasawa | ............. | A61B 6/542 |
| | | | | 378/98 |
| 2011/0126127 A1* | 5/2011 | Mariotti | ................. | G06F 19/321 |
| | | | | 715/753 |
| 2011/0191767 A1* | 8/2011 | Pinsky | .................... | G06F 9/445 |
| | | | | 717/176 |
| 2012/0030289 A1* | 2/2012 | Buford | .................. | G06Q 10/10 |
| | | | | 709/205 |
| 2013/0308839 A1* | 11/2013 | Taylor | .................... | G06F 19/321 |
| | | | | 382/128 |

* cited by examiner

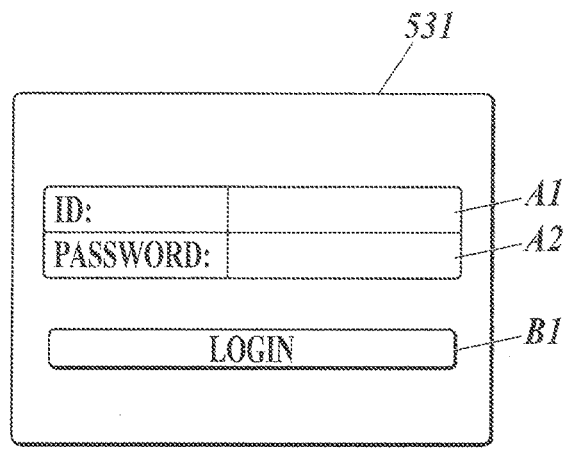

MEDICAL IMAGE CAPTURING SYSTEM

BACKGROUND

Field of the Invention

The present invention relates to a medical image capturing system.

Description of Related Art

Recently, in the field of medicine, there is a medical image management apparatus which takes in medical images generated by various image generating apparatuses to store and manage the taken in medical images in an image data base (DB) (See, Japanese Patent Application Laid-Open Publication No. 2010-124943).

In such system including a medical image management apparatus (server apparatus) and a client terminal, as shown in FIG. 8, when a physician inputs a user name and password on a login screen (operation U1) on the client terminal, the screen advances to a patient list screen. When a patient is selected from the patient list screen (operation U2), the screen advances to an image display screen for taking in a medical image which is obtained by capturing the patient. In the image display screen, when an image take-in button is pressed to instruct the medical image to be taken in from the image generating apparatus (operation U3), the server apparatus is put on a state to stand-by for taking in the medical image from the image generating apparatus. When the medical image of the capturing target patient is generated by the image generating apparatus, the generated medical image is taken in from the image generating apparatus by the server apparatus. Then, in the client terminal, it is possible to refer to the medical image taken in by the server apparatus.

In conventional capturing, for example, the physician performs the above operation U1 to U3 in order on the client terminal provided in the examination room, the physician moves to a capturing room after placing the server apparatus in a state on stand-by to take in the medical image from the medical generating apparatus, and then performs capturing.

When the image generating apparatus is a FPD (Flat Panel Detector) panel, the FPD panel itself detects the irradiating timing of the radiation irradiated from the radiation generating apparatus and generates the medical image according to the irradiated radiation. If the FPD panel is constantly in the driving state (ready state), the battery is consumed rapidly, or irradiating of radiation may be falsely detected by vibration applied to the FPD panel. Therefore, the FPD panel is changed to the driving state linked to when the image take-in button is pressed. Since it is preferable to place the FPD panel in the driving state as close to directly before capturing as possible, it is convenient to provide a client terminal in the capturing room also in addition to the client terminal provided in the examination room so as to be able to press the image take-in button in the capturing room.

However, when the client terminal is provided in the examination room and the capturing room, if capturing is decided during diagnosis in the examination room, there is a problem that the operation needs to be performed redundantly on both client terminals.

For example, when the physician performs the above operation U1 and the operation U2 on the client terminal provided in the examination room, if the physician determines that capturing of the patient is necessary in a state where the image display screen of the patient selected on the client terminal of the examination room is displayed, the physician moves to the capturing room with the patient. Then, similarly, the physician performs the above operation U1 and operation U2 on the client terminal provided in the capturing room, and then presses the image take-in button on the image display screen (operation U3) to place the server apparatus in a stand-by state to take in the medical image from the image generating apparatus.

According to the conventional technique, the information managed on the server apparatus can be similarly referred on the plurality of client terminals. However, in order to display contents displayed on a specific client terminal on a different client terminal, the procedure performed on the specific client terminal needed to be performed similarly on the different client terminal.

SUMMARY

The present invention has been made in consideration of the above problems, and it is one of main objects to enhance operability of a client terminal.

In order to achieve at least one of the above-described objects, according to an aspect of the present invention, there is provided a medical image capturing system including:

a server apparatus;

a plurality of client terminals connected to the server apparatus to be able to communicate data;

an image generating apparatus connected to the server apparatus to be able to communicate data, wherein the server apparatus is configured to include, a display control section which is configured to provide data to a client terminal which is operated according to operation on the client terminal among the plurality of client terminals, the data regarding an operation screen to be displayed on the client terminal which is operated;

an image management section which is configured to take in a medical image generated by the image generating apparatus based on an image take-in instruction from the client terminal and which provides the taken in medical image to the client terminal which instructed the take-in of the image, and a storage section which is configured to store a combination of a parent client terminal and a child client terminal set in advance for an arbitrary client terminal among the plurality of client terminals, wherein, when there is access from the child client terminal, the display control section provides data of an operation screen which is the same as an operation screen displayed on the parent client terminal to the child client terminal.

According to the above aspect of the present invention, it is possible to enhance operability of a client terminal.

Preferably, in the medical image capturing system, the operation screen includes a login screen to login to the medical image capturing system, a patient list screen to select a capturing target patient, and an image display screen to instruct take-in of the medical image.

Preferably, in the medical image capturing system, the image generating apparatus detects irradiating timing of radiation irradiated from a radiation generating apparatus with a plurality of radiation detecting elements to generate a medical image according to irradiating of the radiation; and the server apparatus includes a state control section which is configured to transmit a driving instruction to instruct the image generating apparatus to switch to a driving state when an instruction to take in the image is received from the client terminal.

BRIEF DESCRIPTION OF THE DRAWINGS

The present invention will become more fully understood from the detailed description given hereinbelow and the appended drawings, and thus are not intended to define the limits of the present invention, and wherein;

FIG. 9 is an example of a login screen;

FIG. 10 is an example of a patient list screen;

DETAILED DESCRIPTION OF PREFERRED EMBODIMENTS

Below, an embodiment of the medical image capturing system of the present invention is described with reference to the drawings. However, the present invention is not limited to the illustrated examples.

[Configuration of Medical Image Capturing System]

Figure 1:
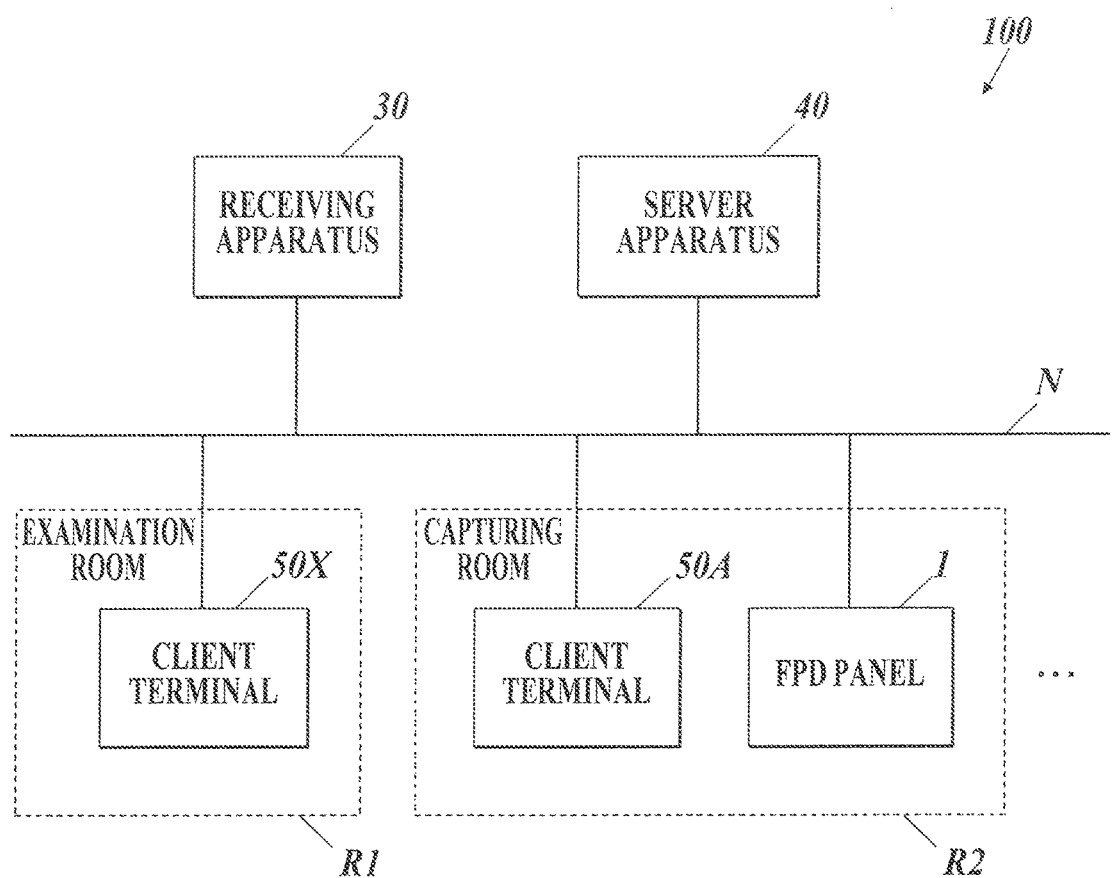
FIG. 1 is a system configuration of a medical image capturing system of the present invention.

FIG. 1 shows a system configuration of the medical image capturing system 100. The medical image capturing system 100 includes a receiving apparatus 30, a server apparatus 40, a plurality of client terminals 50A, 50X, and so on (hereinafter collectively referred to as, client terminals 50), and an FPD panel 1, etc. The various apparatuses included in the medical image capturing system 100 are connected to a communication network N such as a LAN (Local Area Network), etc. through a switching hub not shown. Specifically, the server apparatus 40 is connected with the plurality of client terminals 50A, 50X, etc. to be able to communicate data through the communication network N, and the server apparatus 40 is connected with the FPD panel 1 to be able to communicate data through the communication network N. The client terminal 50X is provided in an examination room R1, and the client terminal 50A and the FPD panel 1 are provided in a capturing room R2.

As a communication method in a hospital, typically a DICOM (Digital Image and Communications in Medicine) standard is used, and DICOM MWM (Modality Worklist Management) and DICOM MPPS (Modality Performed Procedure Step) are used in communication among apparatuses connected through the LAN. The communication method which can be applied to the present embodiment is not limited to the above.

The receiving apparatus 30 is a computer apparatus for receiving registration, calculating accounting, counting medical insurance points, and the like for the patients who come to the hospital. When reception information (reception number, patient name, etc.) is input, the receiving apparatus 30 stores the patient information of the received patient and provides the patient information of the received patient according to the request from external devices.

The server apparatus 40 manages a medical image generated by the FPD panel 1 corresponded with the patient information, and provides the medical image and the patient information according to the request from the external devices.

The client terminal 50 is a computer apparatus for instructing taking in the medical image from the FPD panel 1 on the server apparatus 40, and referring to the medical image managed on the server apparatus 40. The client terminal 50 can be configured with a tablet type terminal, etc., and the data communication between the client terminal 50 and the server apparatus 40 can be done wirelessly. For example, a tablet type terminal is used as the client terminal 50A provided in the capturing room R2.

The FPD panel 1 is a flat cassette type image generating apparatus which captures a diagnosis target portion of the patient as the subject. The FPD panel 1 generates image data of the radiation image based on radiation which is irradiated from the radiation generating apparatus not shown and which passes through the subject. The FPD panel 1 detects irradiating timing of radiation irradiated from the radiation generating apparatus and generates the medical image according to the irradiated radiation.

The medical image capturing system 100 may be provided with an image generating apparatus other than the FPD panel 1, for example, a CR (Computed Radiography) apparatus, an ultrasonography apparatus, and the like.

Next, the configuration of the FPD panel 1 is described.

Figure 2:
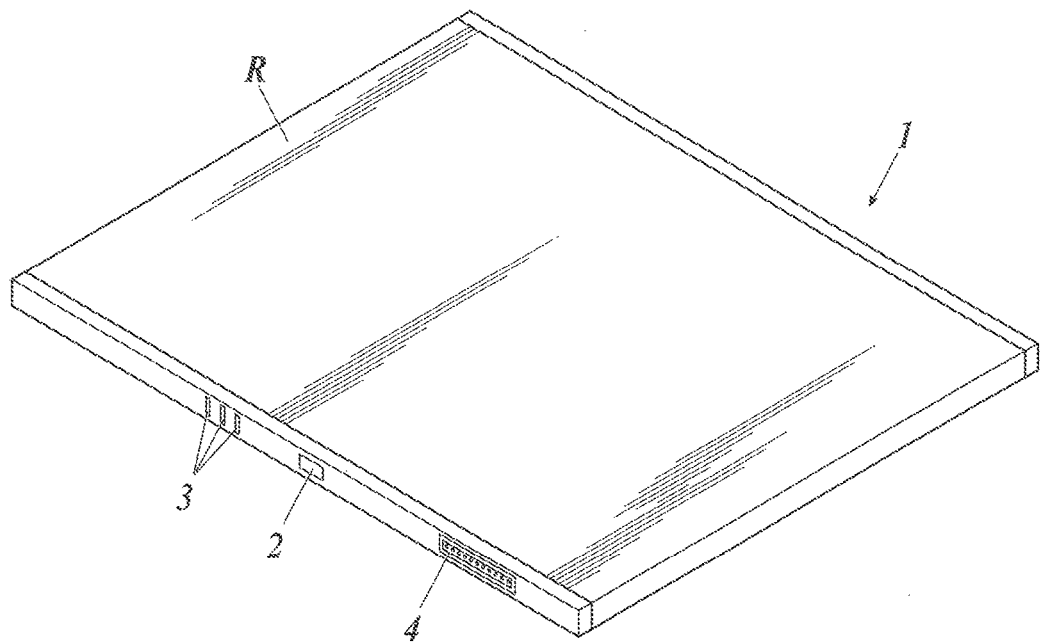
FIG. 2 is a perspective view showing an external appearance of the FPD panel.

FIG. 2 is a perspective view showing an outer appearance of the FPD panel 1. As shown in FIG. 2, the FPD panel 1 is configured with a box including a radiation entering surface R which is the surface on the side where the radiation is irradiated. The box is provided with a power source switch 2 to turn the power source of the FPD panel 1 ON and OFF, an indicator 3 including an LED (Light Emitting Diode) etc., to display the state of the battery 21 (see FIG. 3), the operation state of the FPD panel 1, and the like, and a connector 4 for charging the battery 21.

Figure 3:
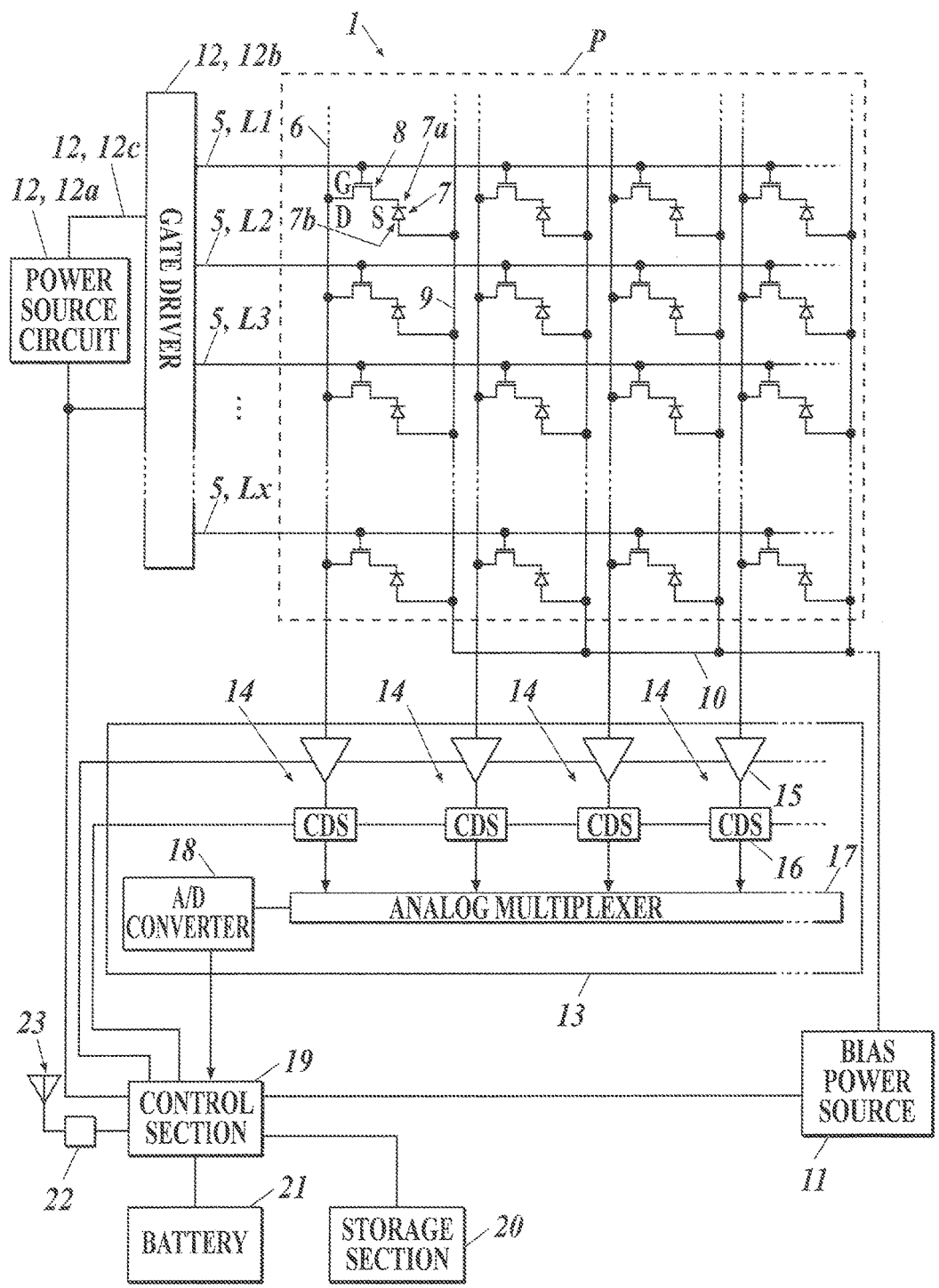
FIG. 3 is a block diagram showing an equivalent circuit of an FPD panel.

FIG. 3 is a block diagram showing an equivalent circuit of an FPD panel 1. As shown in FIG. 3, the detecting section P of the FPD panel 1 is provided with a plurality of scanning lines 5 and a plurality of signal lines 6 intersecting with each other. Each of the small regions divided by the plurality of scanning lines 5 and the plurality of signal lines 6 is provided with a radiation detecting element 7, and a plurality of radiation detecting elements 7 are arranged two dimensionally (matrix shape). According to the present embodiment, a photodiode is used as the radiation detecting element 7. However, for example, other radiation detecting elements can be used such as a phototransistor.

A source electrode $8s$ ("S" in FIG. 3) of a TFT (Thin Film Transistor) 8 which is a switching section is connected to a first electrode $7a$ of the radiation detecting element 7. A drain electrode $8d$ ("D" in FIG. 3) of the TFT 8 is connected to the signal line 6, and a gate electrode $8g$ ("G" in FIG. 3) of the TFT 8 is connected to the scanning line 5.

The TFT 8 turns on when an on voltage is applied to the gate electrode 8g through the scanning line 5 on the scanning driving section 12. The TFT 8 discharges the charge accumulated in the radiation detecting element 7 through the source electrode 8s and the drain electrode 8d to the signal line 6. The TFT 8 turns off when an off voltage is applied to the gate electrode 8g through the connected scanning line 5. The TFT 8 stops the discharge of charge from the radiation detecting element 7 to the signal line 6, and accumulates the charge in the radiation detecting element 7.

One bias line 9 is provided for each row of the radiation detecting element 7 (radiation detecting elements 7 aligned in a vertical direction in FIG. 3), and the second electrode 7b of the radiation detecting element 7 is connected to the bias line 9. Each bias line 9 is bonded to a binding line 10 at a position outside the detecting section P. The binding line 10 is connected to a bias power source 11, and a reverse bias voltage is applied on the second electrode 7b of the radiation detecting element 7 through the binding line 10 and the bias line 9 from the bias power source 11.

Each scanning line 5 is connected to a gate driver 12b of a scanning driving section 12. In the scanning driving section 12, on voltage and off voltage are supplied to the gate driver 12b from a power source circuit 12a through a wiring 12c. Then, the voltage applied to each line L1 to Lx of the scanning line 5 is switched between the on voltage and the off voltage in the gate driver 12b to control the on/off operation of the TFT 8.

Each signal line 6 is connected to a reading circuit 14 provided in a reading IC 13. The reading circuit 14 is configured with an amplifying circuit 15, a correlated double sampling circuit (CDS) 16, and the like. An analog multiplexer 17 and an A/D convertor 18 are provided in the reading IC 13.

In reading processing of image data from the radiation detecting element 7, when the on voltage is applied to a predetermined line Ln of the scanning line 5 from the gate driver 12b of the scanning driving section 12, the on voltage is applied through the line Ln of the scanning line 5 to the gate electrode 8g of the TFT connected to the line Ln, and the TFT 8 turns on. Then, charge is discharged to the signal line 6 through the TFT 8 from the radiation detecting element 7 connected to the TFT 8 turned on.

In the amplifying circuit 15, voltage of a value according to the amount of charge flown through the signal line 6 is output from the output side. The correlated double sampling circuit 16 outputs the value of output from the amplifying circuit 15 which is increased after charge is flown from the radiation detecting element 7 as the image data with the analog value to the downstream side.

Then, the output image data is sequentially transmitted to the A/D convertor 18 through the analog multiplexer 17. The image data is sequentially converted to image data with a digital value in the A/D converter 18, and then output to the storage section 20 to be sequentially stored.

A control section 19 is configured with a computer where a CPU (Central Processing Unit), a ROM (Read Only Memory), a RAM (Random Access Memory), an input/output interface, and the like (all not shown) are connected to a bus, a FPGA (Field Programmable Gate Array), and the like. The control section 19 can be configured with a dedicated control circuit.

The control section 19 controls the operation of each functional section of the FPD panel 1 such as controlling the scanning driving section 12 and the reading circuit 14 to perform reading processing of the image data. A storage section 20 configured with a SRAM (static RAM), a SDRAM (synchronous DRAM) and the like is connected to the control section 19.

The control section 19 is connected to the battery 21 which supplies power necessary for each functional section such as the scanning driving section 12, the reading circuit 14, the storage section 20, the bias power source 11, and the like.

The control section 19 is connected to a wireless communication section 22, and the wireless communication section 22 communicates wirelessly with external devices through an antenna apparatus 23. For example, the wireless communication section 22 is configured to wirelessly communicate with external devices using a wireless LAN employing the IEEE 802.11 standard.

The FPD panel 1 may be in a state among three states of "driving state", "driving prepared state", and "non-driving state".

The driving state (ready state, capturing prepared state) is a state where capturing can be performed any time. Specifically, the gate driver 12b applies on voltage to lines L1 to Lx of the scanning line 5, and the reading of the charge accumulated in the radiation detecting element 7 is repeated to constantly place the charge in a reset state. The gate driver 12b applies off voltage to the gate electrode 8g through the scanning line 5 to be able to start accumulating charge at any time. Among the three states, the consumption of energy of the FPD panel 1 is largest in the driving state. The control section 19 judges that the radiation is irradiated when the signal value (corresponding to the radiation intensity) according to the amount of charge read from the radiation detecting element 7 exceeds a predetermined threshold value in the driving state.

The driving prepared state (standby state, capturing standby state) is a state which can be promptly switched to the driving state. The amount of time when the state switches from the driving prepared state to the driving state is shorter than the amount of time when the state switches from the non-driving state to the driving state. Specifically, the on voltage/off voltage is not applied to each line L1 to Lx of the scanning line 5, and the reading is stopped. Other than the above, the state is the same as the driving state, and the amount of power consumption is smaller in the amount of the power necessary for reading the charge. Specifically, when the FPD panel 1 is in the driving prepared state, the power consumption is smaller than the driving state but the power consumption is larger than the non-driving state. Since the amount of time used to switch from the non-driving state to the driving state is a few seconds, the user cannot promptly execute capturing from the non-driving state even if the user attempts to execute capturing. However, in the driving prepared state, the charge accumulated in the radiation detecting element 7 is read and the charge is reset so that it is possible to switch to the driving state at any time.

The non-driving state (sleep state) is a state where power is not supplied to some of the units and capturing cannot be performed. Specifically, power is supplied to the wireless communication section 22 so as to be able to receive the signal from the external devices or to the functional sections such as the control section 19, etc. which are necessary to at least keep the apparatus active. Power is not supplied to sections other than the above. The power consumption of the FPD panel 1 is smallest in the non-driving state among the three states.

Figure 4:
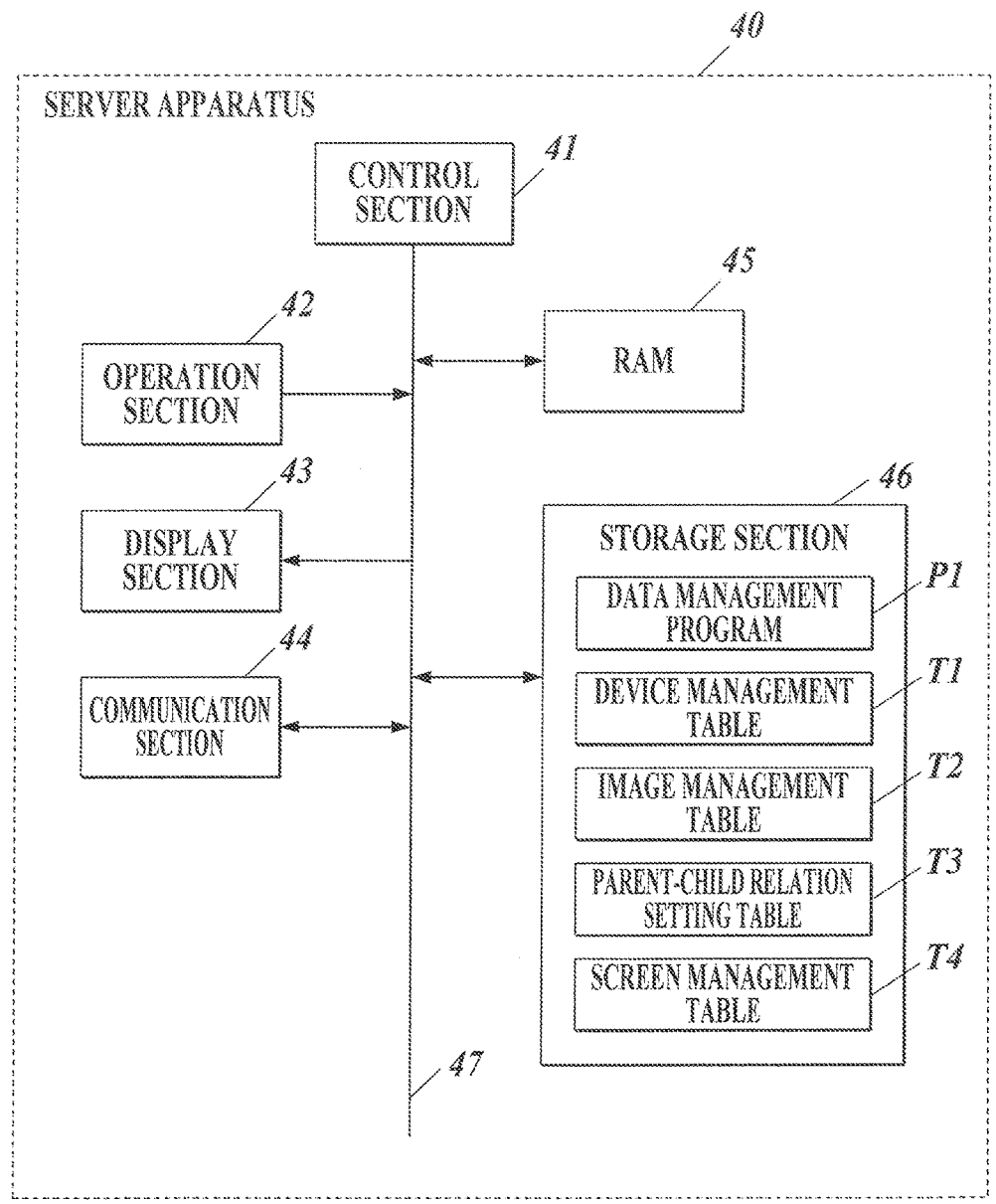
FIG. 4 is a block diagram showing a function configuration of a server apparatus.

FIG. 4 shows a functional configuration of the server apparatus 40. As shown in FIG. 4, the server apparatus 40 includes a control section 41, an operation section 42, a display section 43, a communication section 44, a RAM 45, a storage section 46, and the like, and each section is connected through a bus 47.

The control section 41 includes a CPU and the like. The control section 41 reads various programs such as a system program, processing program, etc. stored in the storage section 46, expands the program in the RAM 45, and executes various processing according to the expanded program.

The operation section 42 includes a keyboard provided with character input keys, numeral input keys, various function keys, etc., and a pointing device such as a mouse, etc. The pressed signal of the key pressed on the keyboard and the operation signal of the mouse are output to the control section 41 as the input signal.

The display section 43 includes a monitor such as a LCD (Liquid Crystal Display), etc., and displays various screens according to an instruction of a display signal input from the control section 41.

The communication section 44 includes a network interface and the like, and transmits and receives data between external devices connected to the communication network N.

The RAM 45 functions as a work area to temporarily store various programs which are read from the storage section 46 and which can be executed by the control section 41, or input or output data, or the like in various processing executed by the control section 41.

The storage section 46 includes a non-volatile memory such as a HDD (Hard Disk Drive), semiconductor, etc. The storage section 46 stores various programs, data necessary for various processing, etc. For example, the storage section 46 stores a data management program P1, a device management table T1, an image management table T2, a parent-child relation setting table T3, a screen management table T4, medical images, and the like.

The device management table T1 is a table for managing the information regarding the client terminal 50 which instructs take-in of the image. In the device management table T1, "client terminal name (IP address, etc.)" of the client terminal 50 instructed to take in the image is stored corresponded with "patient ID" of the patient who is the capturing target.

When there is an instruction to take in an image from any of the client terminals 50, a value is stored in the "client terminal name" field and the "patient ID" field of the device management table T1. Then, when the image is taken in from the FPD panel 1 to the server apparatus 40 according to the instruction to take in the image, the "client terminal name" field and the "patient ID" field of the device management table T1 return to the "NULL" state. The server apparatus 40 can receive an instruction to take in an image only when the "client terminal name" field and the "patient ID" field of the device management table T1 are "NULL" (exclusive control).

Figure 5:
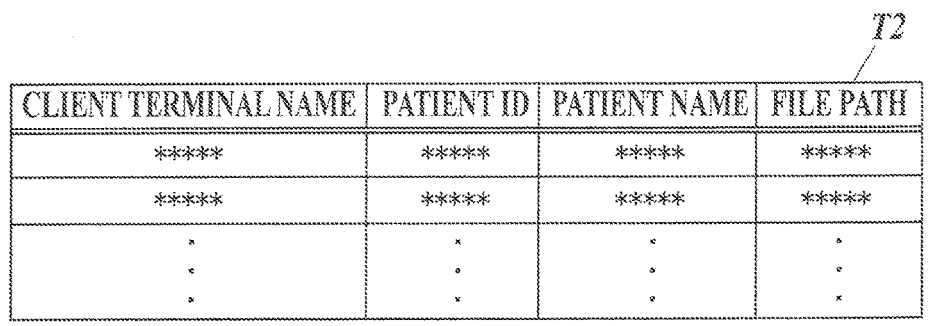
FIG. 5 is an example of an image management table.

FIG. 5 shows an example of the image management table T2. The image management table T2 is a table for managing information regarding the medical image. In the image management table T2, "client terminal name", "patient ID", "patient name", "file path", etc. are stored corresponded to each other as one record.

Figure 15:
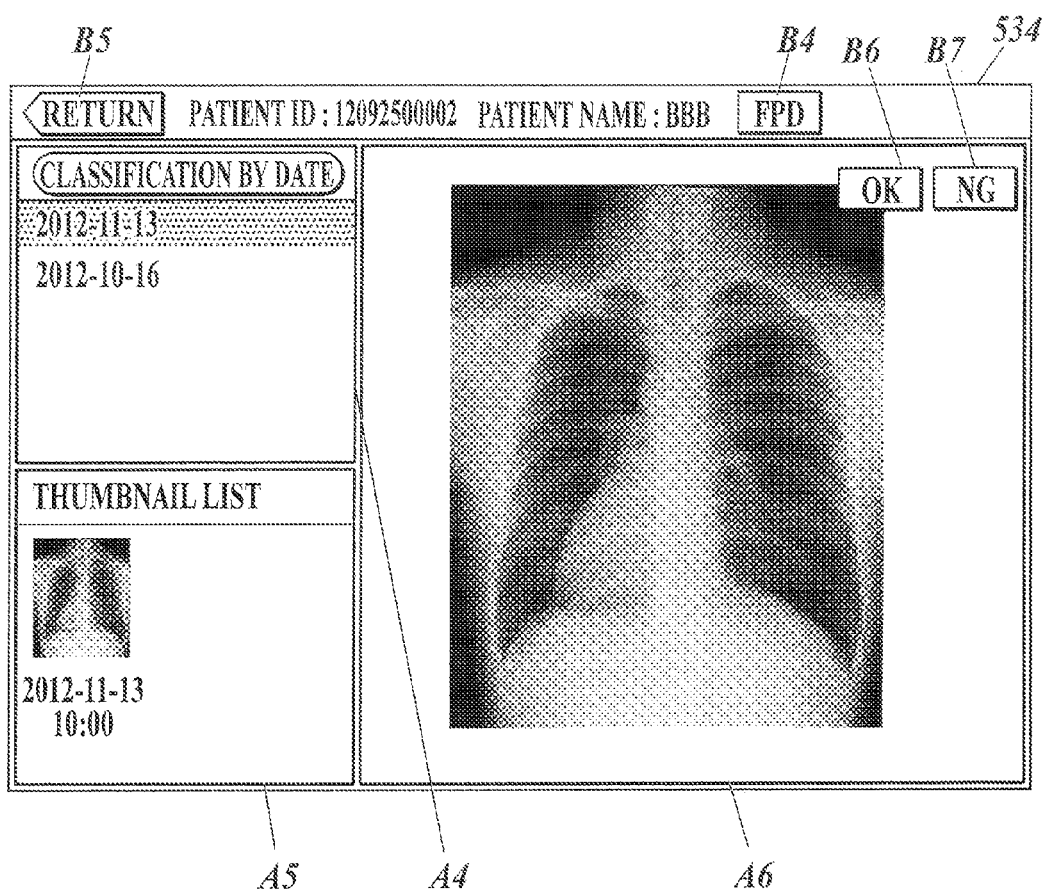
FIG. 15 is an example of an image display screen in a state where the medical image is displayed.

In the "client terminal name" field, the client terminal name (IP address, etc.) of the client terminal 50 instructed to take in the image is stored. When the target image is approved (OK button B6 shown in FIG. 15 is pressed), the "client terminal name" field becomes the "NULL" state.

The "patient ID" field stores the patient ID of the patient who is the capturing target.

The "patient name" field stores the patient name (Ascii, Kana-character, Kanji-character) of the patient who is the capturing target.

The "file path" field stores the file path showing where the file of the target image is stored.

In the parent-child relation setting table T3, a combination of a parent client terminal which is to be a link source and a child client terminal which is to be a link destination is set in advance for arbitrary client terminals 50 among the plurality of client terminals 50. In other words, the parent-child relation setting table T3 is a table setting the parent-child relation (linking relation) among client terminals 50. It is possible to set a plurality of child client terminals for one parent client terminal. Alternatively, it is possible to set a plurality of parent client terminals for one child terminal. Moreover, an order of priority is set for the plurality of parent client terminals set for the same child client terminal. When one parent client terminal is set for one child client terminal, the priority order of the set parent client terminal becomes first. When the parent client terminal is decided for the child client terminal, even if a parent client terminal with a higher priority order is started during the processing, the parent client terminal is not changed. Unless the child client terminal does not login again, the link with the same parent client terminal continues.

Figure 6:
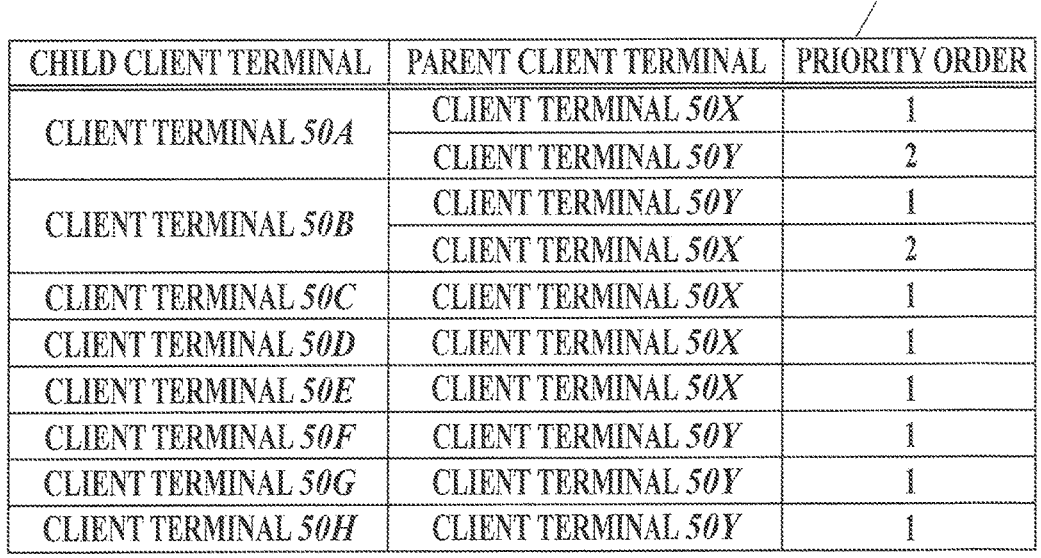
FIG. 6 is an example of a parent-child relation setting table.

FIG. 6 shows an example of the parent-child relation setting table T3. In the example shown in FIG. 6, one or a plurality of parent client terminals and the priority order of the parent client terminals are corresponded to each child client terminal. In the parent-child relation setting table T3, for example, the IP address, PC name, etc. are used as information to specify each client terminal 50.

In the screen management table T4, data of the operation screen displayed on the client terminal 50 is stored for each client terminal 50. In the present embodiment, an example which uses data for display of each operation screen as the data of the operation screen is described. Alternatively, it is possible to use identification information to identify each operation screen as the data of the operation screen.

According to the operation of each client terminal 50 among the plurality of client terminals 50, the control section 41 provides data of the operation screen to be displayed on the client terminal 50 which is operated to the client terminal 50 which is operated. When there is access from the child client terminal, the control section 41 provides to the child client terminal data of the operation screen which is the same as the operation screen displayed on the parent client terminal corresponded to the child client terminal. In other words, the control section 41 functions as a display control section.

Based on the instruction to take in the image from the client terminal 50, the control section 41 takes in the medical image generated by the FPD panel 1 and provides the taken in medical image to the client terminal 50 where there is an instruction to take in the image. In other words, the control section 41 functions as the image managing section.

When the instruction to take in an image is received from the client terminal 50, the control section 41 transmits a driving instruction to instruct change to the driving state to the FPD panel 1. In other words, the control section 41 functions as a state control section.

In the client terminal 50 where there is an instruction to take in the image, the user can select whether to approve the medical image taken in from the FPD panel 1 or to discard the image. In other words, only the client terminal 50 where the instruction to take in the image is input has the authority to approve the taken in medical image.

When there is an instruction to approve the medical image from the client terminal 50 which instructed the take-in of the image, the control section 41 changes the "client terminal name" field of the corresponding record in the image management table T2 to "NULL", and reference of the approved medical image from the other client terminals 50 is allowed.

Figure 7:
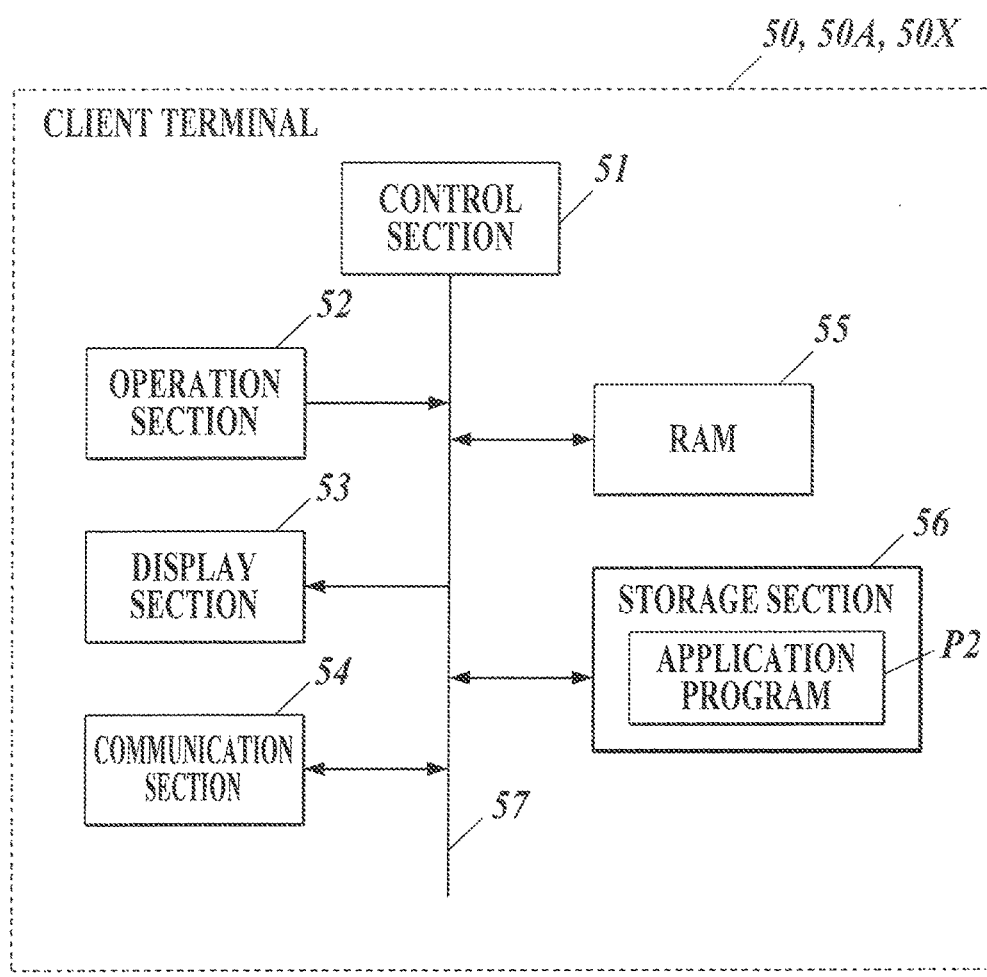
FIG. 7 is a block diagram showing a functional configuration of a client terminal.

FIG. 7 is a diagram showing a functional configuration of the client terminal 50. As shown in FIG. 7, the client terminal 50 includes a control section 51, an operation section 52, a display section 53, a communication section 54, a RAM 55, a storage section 56, and the like, and each section is connected by a bus 57.

The control section 51 includes a CPU and the like. The control section 51 reads various programs such as a system program, processing program, etc. stored in the storage section 56, expands the program in the RAM 55, and executes various processing according to the expanded program.

The operation section 52 includes a keyboard provided with character input keys, numeral input keys, various function keys, etc., and a pointing device such as a mouse, etc. The pressed signal of the key pressed on the keyboard and the operation signal of the mouse are output to the control section 51 as the input signal.

When the client terminal 50 is a tablet type terminal, the operation section 52 includes operation keys such as a power source key to turn on/off the power and a touch panel overlapped on the display section 53. The operation signal corresponding to the operation keys and the operation signal according to the position touched by a finger of the user, etc. are output to the control section 51.

The display section 53 includes a LCD, and displays various screens according to an instruction of a display signal input from the control section 51.

The communication section 54 includes a network interface and the like, and transmits and receives data between external devices connected to the communication network N.

The communication section 54 can transmit and receive data by wireless communication such as Wi-Fi (Wireless Fidelity) communication with external devices connected to the communication network N. For example, such communication is realized by an antenna, RF convertor, etc. which transmits and receives a wireless signal through a wireless station provided by communication service enterprises. The communication section 54 may communicate wirelessly with the server apparatus 40 using infrared communication (IrDA/IrMC), Bluetooth (registered trademark), or the like.

The RAM 55 functions as a work area to temporarily store various programs which are read from the storage section 56 and which can be executed by the control section 51, or input or output data, or the like in various processing executed by the control section 51.

The storage section 56 includes a non-volatile memory such as a HDD, semiconductor, etc. The storage section 56 stores various programs, data necessary for various processing, etc. For example, the storage section 56 stores an application program P2, and the like.

[Operation Screen in Client Terminal]

Figure 8:
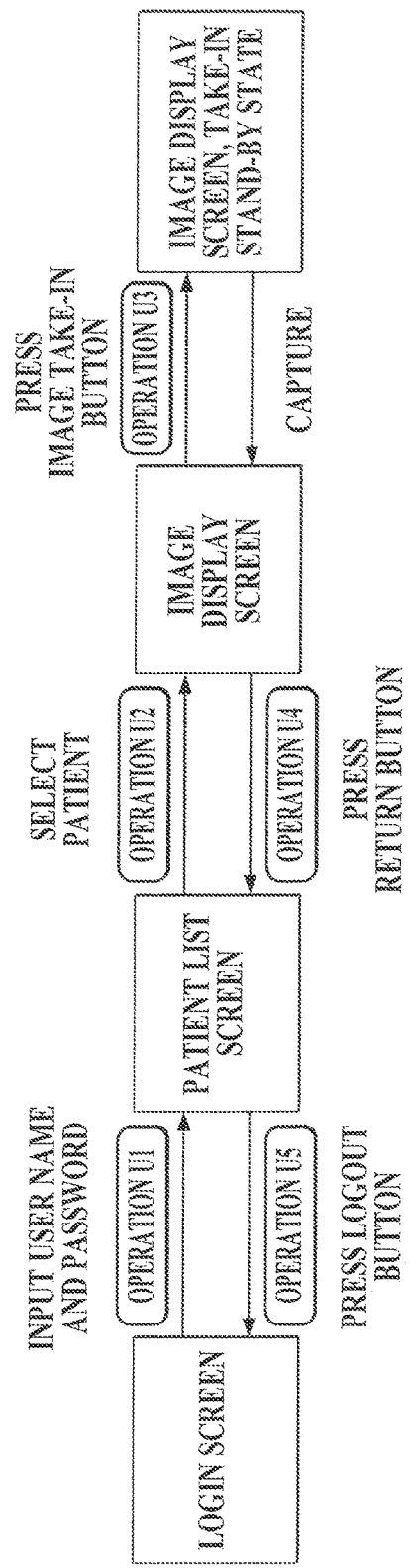
FIG. 8 is a diagram for describing the advancing of the operation screen displayed on the client terminal.

Next, the advancing of the operation screen displayed on the display section 53 of the client terminal 50 is described with reference to FIG. 8. Each operation screen is provided by the Web server function of the server apparatus 40.

First, in the client terminal 50, when a predetermined URL (Uniform Resource Locator) to access to the server apparatus 40 is input on the WEB browser or when a predetermined icon corresponding to the predetermined URL is double-clicked by operation on the operation section 52, the control section 51 transmits the request to access to the predetermined URL to the server apparatus 40 through the communication section 54.

In the server apparatus 40, when the communication section 44 receives the access request from the client terminal 50, the control section 41 transmits the data to display the login screen through the communication section 44 to the client terminal 50 which made the access request. The login screen is an operation screen to login to the medical image capturing system 100. The control section 41 stores the data to display the login screen corresponded with the client terminal 50 in the screen management table T4.

In the client terminal 50, the communication section 54 receives the data to display the login screen, and the login screen is displayed on the display section 53.

FIG. 9 shows an example of a login screen 531. The login screen 531 includes a user ID input area A1, a password input area A2, and a login button B1.

In the login screen 531, the operation section 52 is operated to input the user ID and the password respectively in the user ID input area A1 and the password input area A2 (operation U1), and when the login button B1 is pressed, the control section 51 transmits the user ID, the password, and the IP address of the client terminal 50 through the communication section 54 to the server apparatus 40.

In the server apparatus 40, the communication section 44 receives the user ID, the password, and the IP address of the client terminal 50, and the control section 41 judges whether the received combination of the user ID and the password matches with the combination of the user ID and the password registered in advance. When the received combination of the user ID and the password matches with the combination of the user ID and the password registered in advance, the control section 41 authorizes the user to login to the client terminal 50.

When the login is authorized, in the server apparatus 40, the control section 41 obtains the patient information of the patient who performed reception processing on this day from the receiving apparatus 30, and generates the data to display the patient list screen based on the obtained patient information. Then, the control section 41 transmits data to display the patient list screen through the communication section 44 to the client terminal 50. The patient list screen is an operation screen for selecting the capturing target patient. The control section 41 stores the data to display the patient list screen corresponded with the client terminal 50 in the screen management table T4.

In the client terminal 50, the communication section 54 receives the data to display the patient list screen, and the patient list screen is displayed on the display section 53.

FIG. 10 shows an example of a patient list screen 532. The patient list screen 532 includes a patient list display area A3, a display button B2, and a logout button B3. The patient list display area A3 displays the patient information of the patient who performed reception processing on this day. The display button B2 is a button to instruct display of the image display screen of the patient selected in the patient list display area A3. The logout button B3 is a button to instruct logout from the medical image capturing system 100.

In the patient list screen 532, the operation section 52 is operated to select the capturing target patient from the patient displayed on the patient list display area A3 (operation U2). When the display button B2 is pressed, the control section 51 transmits the information showing the patient (patient ID, etc.) through the communication section 54 to the server apparatus 40.

In the server apparatus 40, when the communication section 44 receives information showing the patient, the control section 41 transmits the data to display the image display screen of the patient through the communication section 44 to the client terminal 50. The image display screen is the operation screen to instruct take-in of the medical image. The control section 41 stores the data to display the image display screen of the selected patient corresponded with the client terminal 50 in the screen management table T4.

In the client terminal 50, the communication section 54 receives the data to display the image display screen and the image display screen of the selected patient is displayed on the display section 53.

Figure 11:
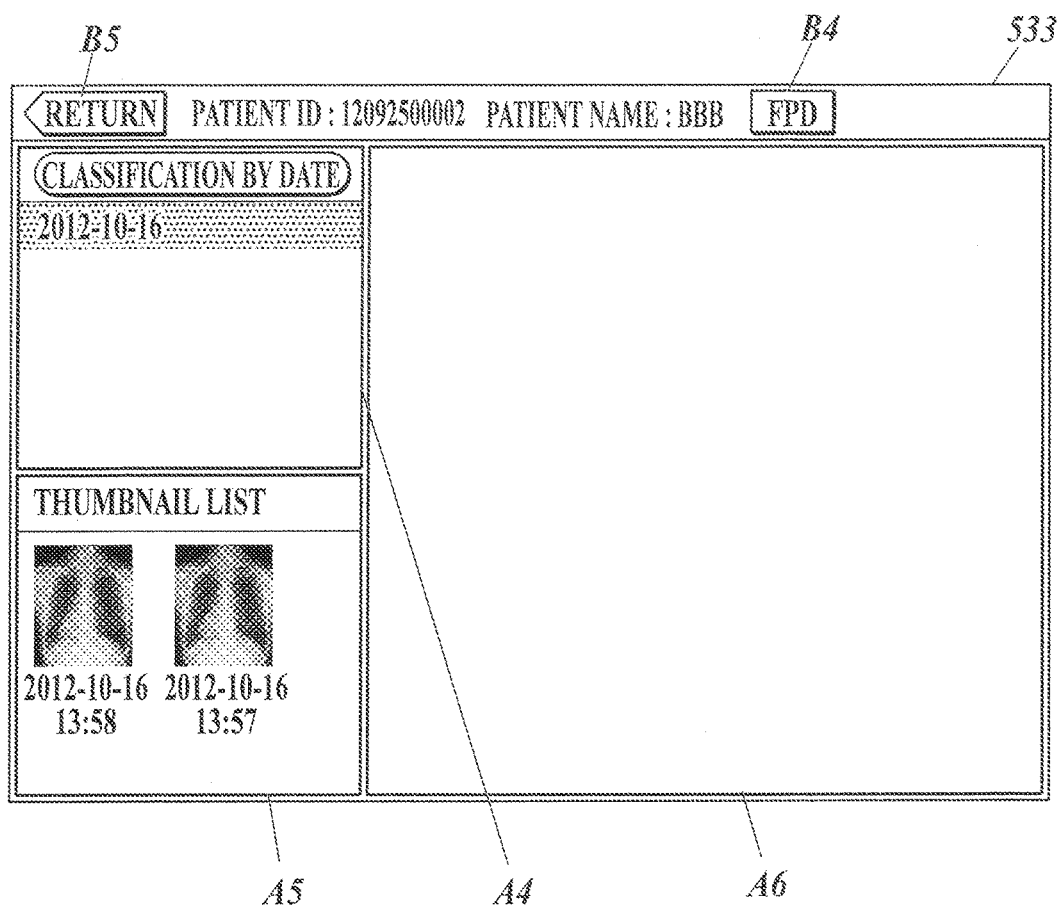
FIG. 11 is an example of an image display screen.

FIG. 11 shows an example of an image display screen 533. The image display screen 533 includes an examination list display area A4, a thumbnail image display area A5, an image display area A6, an image take-in button B4, and a return button B5. The examination list display area A4 displays a list of the examination (captured image) performed on the capturing target patient in the past. The thumbnail image display area A5 displays the thumbnail image of the image captured in the examination selected in the examination list display area A4. The image display area A6 displays the medical image instructed to be taken in by the client terminal 50 and the diagnosis target image selected from the thumbnail image displayed in the thumbnail image display area A5. The image display area A6 does not display any images before the image is taken in or before the diagnosis target image is selected. The image take-in button B4 is provided for each image generating apparatus (FPD panel 1, etc.), and is a button to instruct to take in the medical image transmitted from the corresponding image generating apparatus as the image of the patient who is the diagnosis target at present. The return button B5 is the button to instruct to return to the patient list screen 532.

In the image display screen 533, when the operation section 52 is operated to press the image take-in button B4 corresponding to the FPD panel 1 which performs capturing (operation U3), the control section 51 transmits an instruction (image take-in instruction) to take in the medical image transmitted from the FPD panel 1 as the image of the target patient through the communication section 54 to the server apparatus 40.

In the server apparatus 40, when the communication section 44 receives the image take-in instruction, the control section 41 stores the IP address of the client terminal 50 which instructed the take-in of the image and the patient ID in the device management table T1 of the storage section 46, and the state is to be stand-by for take-in of the medical image generated in the FPD panel 1.

In the image display screen 533, when the operation section 52 is operated to press the return button B5 (operation U4), the control section 51 transmits the instruction to return to the patient list screen through the communication section 54 to the server apparatus 40.

In the server apparatus 40, when the communication section 44 receives the instruction to return to the patient list screen, the control section 41 transmits the data to display the patient list screen through the communication section 44 to the client terminal 50. The control section 41 stores the data to display the patient list screen corresponded with the client terminal 50 in the screen management table T4.

In the client terminal 50, the communication section 54 receives the data to display the patient list screen and displays the patient list screen on the display section 53.

In the patient list screen 532, when the operation section 52 is operated to press the logout button B3 (operation U5), the control section 51 transmits the instruction to logout through the communication section 54 to the server apparatus 40.

In the server apparatus 40, when the communication section 44 receives the instruction to logout, the control section 41 transmits the data to display the login screen through the communication section 44 to the client terminal 50. The control section 41 stores the data to display the login screen corresponded with the client terminal 50 in the screen management table T4.

In the client terminal 50, the communication section 54 receives data to display the login screen and the login screen is displayed on the display section 53.

[Advance Preparation]

The parent-child relation setting table T3 is set as preparation in advance in the medical image capturing system 100.

First, the operation section 42 of the server apparatus 40 is operated to set the parent client terminal. The control section 41 stores the information (IP address, PC name, etc.) to specify the set parent client terminal in the RAM 45. For example, as the parent client terminal, the client terminals 50X and 50Y are set.

Next, the operation section 42 is operated to set the child client terminal on the set parent client terminal. The control section 41 stores the information (IP address, PC name, etc.) to specify the child client terminal set for each parent client terminal in the RAM 45. For example, the client terminals 50A, 50B, 50C, 50D, and 50E are set as the child client terminals for the client terminal 50X which is to be the parent client terminal, and the client terminals 50A, 50B, 50F, 50G, and 50H are set as the child client terminals for the client terminal 50Y which is to be the parent client terminal.

Next, the operation section 42 is operated to set the priority order of the parent client terminal for each child client terminal. The control section 41 stores the priority order of the parent client terminal set for each child client terminal in the RAM 45. For example, in the client terminal 50A which is to be the child client terminal, the client terminal 50X is set as the parent client terminal first in the priority order, and the client terminal 50Y is set as the parent client terminal second in the priority order. In the client terminal 50B which is to be the child client terminal, the client terminal 50Y is set as the parent client terminal first in the priority order, and the client terminal 50X is set as the parent client terminal second in the priority order. In the client terminals 50C, 50D, and 50E which are to be the child client terminals, the client terminal 50X is set as the parent client terminal first in the priority order. In the client terminals 50F, 50G, and 50H which are to be child client terminals, the client terminal 50Y is set as the parent client terminal first in the priority order. After the above setting, the control section 41 generates the parent-child relation setting table T3 based on various setting content stored in the RAM 45.

[Operation of Medical Image Capturing System]

Next, the operation of the medical image capturing system 100 is described.

Figure 12:
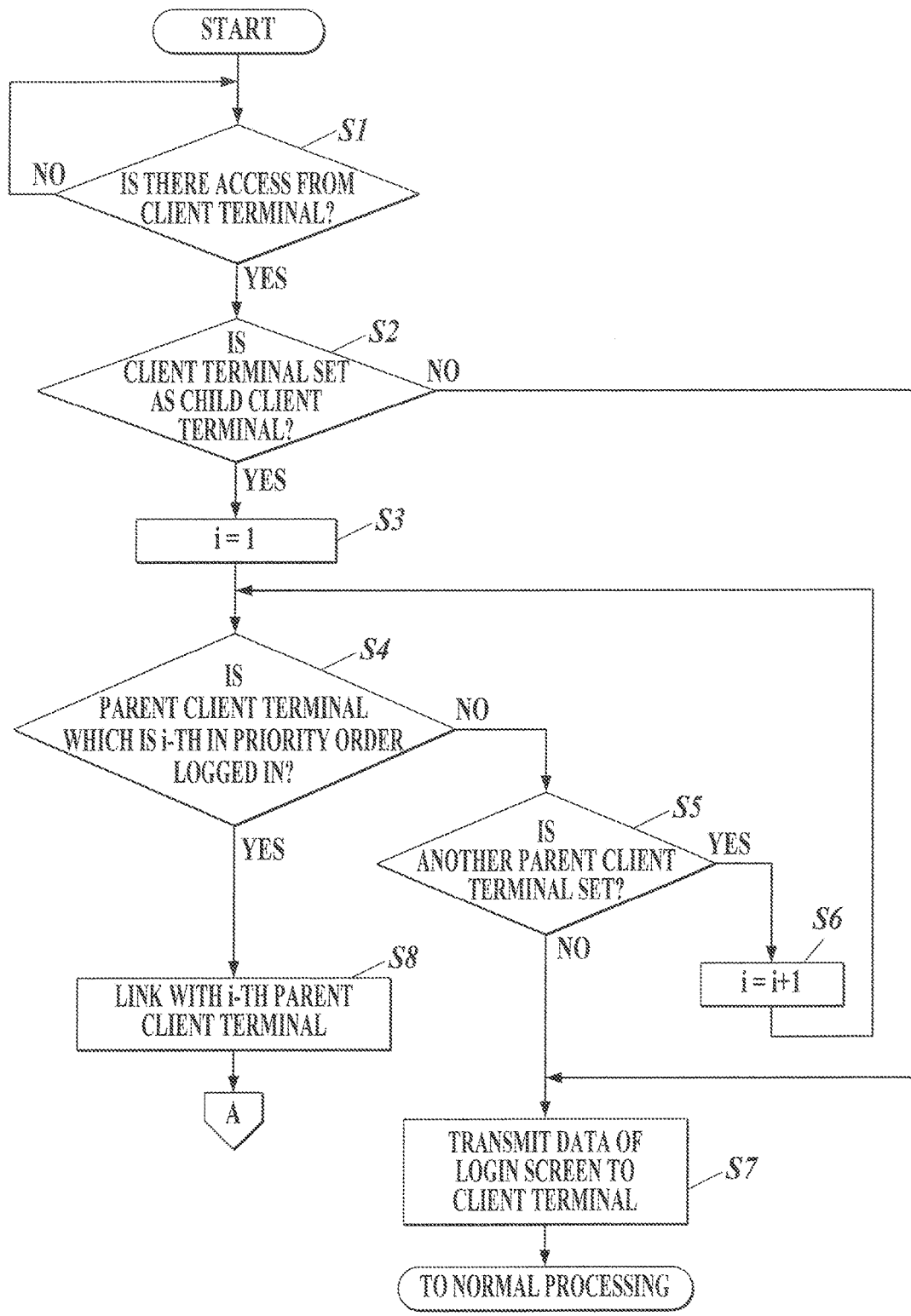
FIG. 12 is a flowchart showing image take-in processing performed on the server apparatus.
Figure 13:
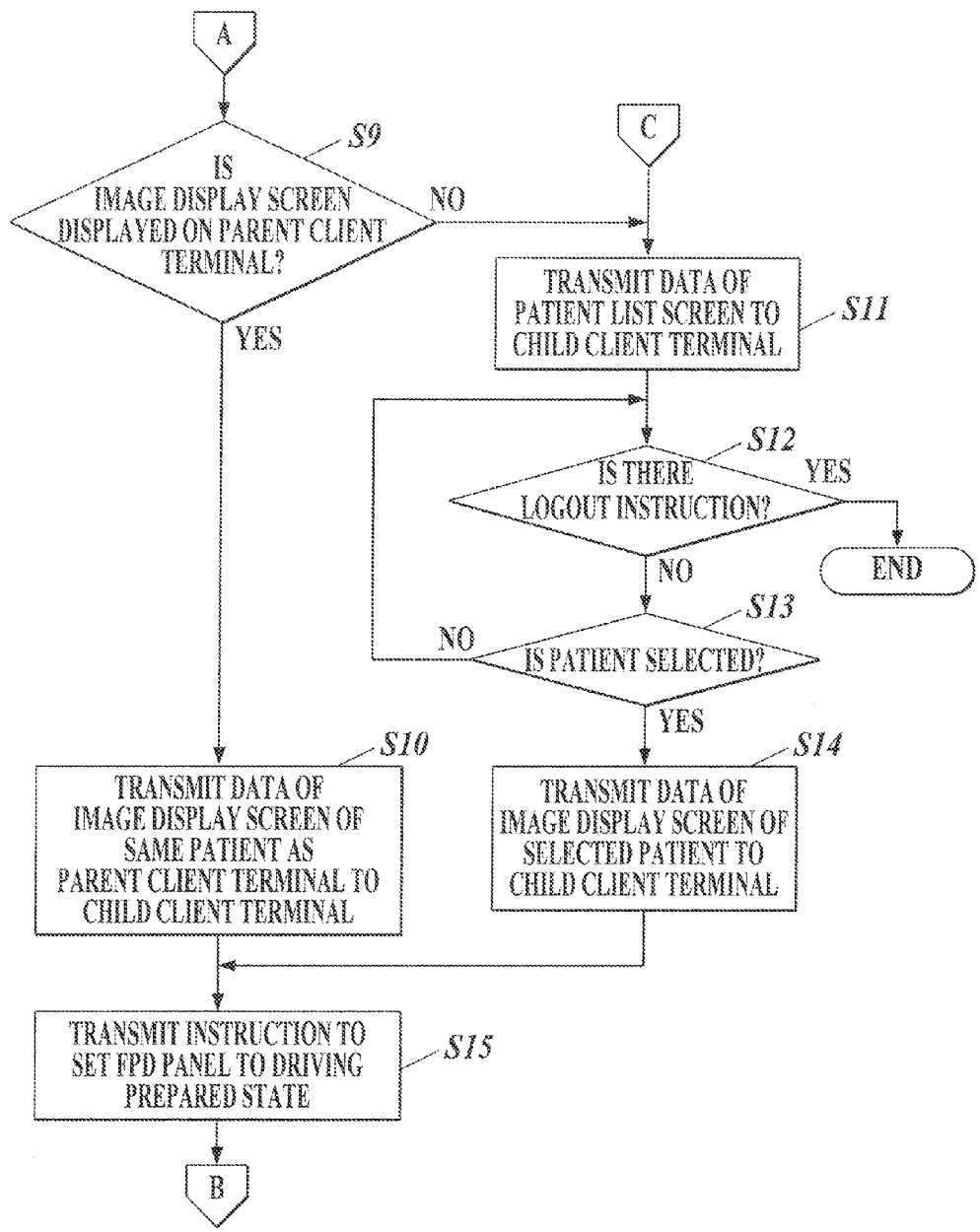
FIG. 13 is a flowchart showing image take-in processing performed on the server apparatus.
Figure 14:
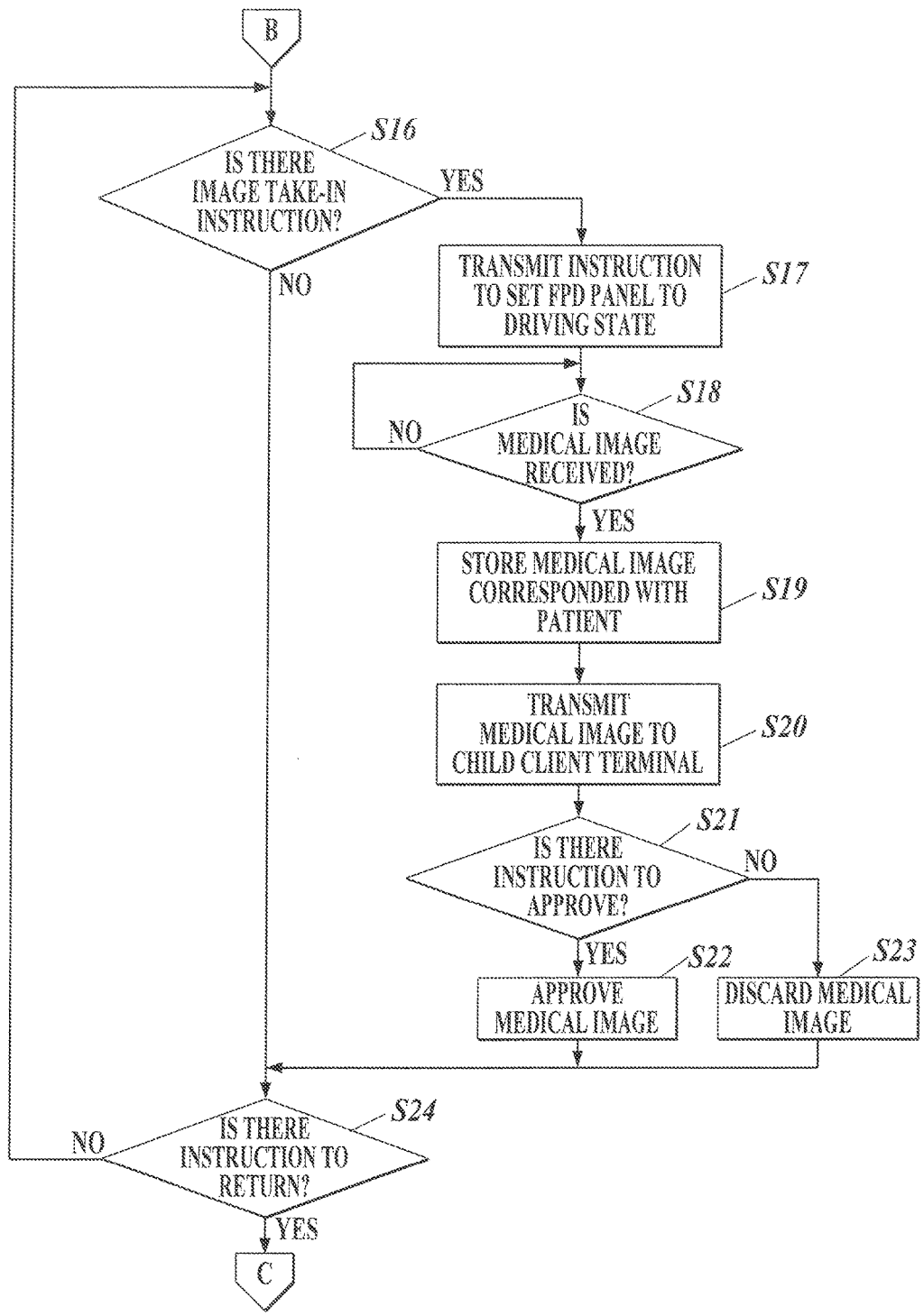
FIG. 14 is a flowchart showing image take-in processing performed on the server apparatus.

FIG. 12 to FIG. 14 are flowcharts showing the image take-in processing performed in the server apparatus 40. The processing is realized with software processing executed by the control section 41 in coordination with the data management program P1 stored in the storage section 46.

First, the control section 41 judges whether there is access to the server apparatus 40 from any of the client terminals 50 (step S1). Specifically, the control section 41 judges whether a request to access to a predetermined URL is received through the communication section 44 from any of the client terminals 50.

When there is access to the server apparatus 40 from any of the client terminals 50 (step S1; YES), the control section 41 refers to the parent-child relation setting table T3 stored in the storage section 46, and the control section 41 judges whether this client terminal 50 is set as the child client terminal (step S2).

When the client terminal 50 requesting the access is set as the child client terminal (step S2; YES), the control section 41 sets the initial value of i to 1 (step S3).

Next, the control section 41 refers to the parent-child relation setting table T3 stored in the storage section 46, and the parent client terminal set i-th in the priority order for the client terminal 50 (child client terminal) requesting the access is obtained. Then, it is judged whether the parent client terminal set i-th in the priority order is already logged in (step S4).

When the parent client terminal i-th in the priority order is not logged in (step S4; NO), the control section 41 refers to the parent-child relation setting table T3 stored in the storage section 46, and judges whether another parent client terminal is set for the client terminal 50 requesting the access (step S5). When another parent client terminal is set (step S5; YES), the control section 41 increments 1 to i (step S6), and returns the processing to step S4. As described above, according to the priority order, it is judged in order whether the parent client terminal is logged in.

In step S2, when the client terminal 50 requesting the access is not set as the child client terminal (step S2; NO), or in step S5, when another parent client terminal is not set for the client terminal 50 requesting the access (all of the parent client terminals set for the child client terminal are not logged in) (step S5; NO), the control section 41 transmits data to display the login screen through the communication section 44 to the client terminal 50 (step S7).

The login screen is displayed on the display section 53 of the client terminal 50 (see FIG. 9). Then, in the client terminal 50, normal processing is performed based on the operation procedure the same as when the client terminal 50 is started as a single client terminal.

In step S4, when the parent client terminal in the i-th priority order is logged in (step S4; YES), the control section 41 links the parent client terminal set in the i-th priority order to the client terminal 50 requesting the access (step S8). When a parent-child relation between client terminals 50 is established, the image take-in button of the image display screen displayed on the parent client terminal becomes invalid.

Described below is an example where the parent client terminal linked in step S8 is the client terminal 50X, and the child client terminal requesting access in step S1 is the client terminal 50A.

Advancing to FIG. 13, the control section 41 refers to the data of the operation screen of the parent client terminal 50X stored in the screen management table T4 of the storage section 46, and judges whether the image display screen is displayed on the display section 53 of the parent client terminal 50X (step S9).

When the image display screen is displayed on the display section 53 of the parent client terminal 50X (step S9; YES), the control section 41 transmits data to display the image display screen of the same patient as the image display screen displayed on the display section 53 of the parent client terminal 50X through the communication section 44 to the child client terminal 50A (step S10). The control section 41 stores data to display the image display screen of the same patient as the parent client terminal 50X corresponded with the child client terminal 50A in the screen management table T4.

The image display screen of the same patient as the parent client terminal 50X is displayed on the display section 53 of the child client terminal 50A (see FIG. 11).

In step S9, when the image display screen is not displayed on the display section 53 of the parent client terminal 50X (step S9; NO), in other words, when the patient list screen is displayed on the display section 53 of the parent client terminal 50X, the control section 41 transmits the data to display the patient list screen through the communication section 44 to the child client terminal 50A (step S11). The control section 41 stores the data to display the patient list screen corresponded with the child client terminal 50A in the screen management table T4.

The patient list screen (operation screen same as the parent client terminal 50X) is displayed on the display section 53 of the child client terminal 50A (see FIG. 10).

Next, the control section 41 judges whether there is an instruction to instruct logout on the patient list screen displayed on the display section 53 of the child client terminal 50A by operation on the operation section (step S12). Specifically, the control section 41 judges whether the logout button is pressed on the patient list screen in the child client terminal 50A.

In the child client terminal 50A, when there is an instruction to logout (step S12; YES), the control section 41 transmits the data to display the login screen through the communication section 44 to the child client terminal 50A, and the processing on the child client terminal 50A ends.

In step S12, when there is no instruction to logout in the child client terminal 50A (step S12; NO), the control section 41 judges whether the patient is selected on the patient list screen displayed on the display section 53 of the child client terminal 50A by operation on the operation section 52 (step S13).

When the patient is not selected on the patient list screen of the child client terminal 50A (step S13; NO), the processing returns to step S12.

In step S13, when the patient is selected on the patient list screen displayed on the display section 53 of the child client terminal 50A (step S13; YES), the control section 41 transmits the data to display the image display screen of the selected patient through the communication section 44 to the child client terminal 50A (step S14). The control section 41 stores the data to display the image display screen of the selected patient corresponded with the child client terminal 50A in the screen management table T4.

The image display screen of the selected patient is displayed on the display section 53 of the child client terminal 50A (see FIG. 11).

After step S10 or step S14, in other words, at the timing when the screen displayed on the display section 53 of the child client terminal 50A advances to the image display screen of the capturing target patient, the control section 41 transmits through the communication section 44 the driving preparing instruction to instruct the FPD panel 1 to switch to the driving prepared state (step S15).

In the FPD panel 1, when the wireless communication section 22 receives the driving preparing instruction, the control section 19 changes the state to the driving prepared state.

Next, advancing to FIG. 14, the control section 41 judges whether there is an image take-in instruction on the image display screen displayed on the display section 53 of the child client terminal 50A by the operation from the operation section 52 (step S16). Specifically, the control section 41 judges whether the image take-in button of the image display screen is pressed in the child client terminal 50A.

In the child client terminal 50A, when there is an image take-in instruction (step S16; YES), the control section 41 stores the "client terminal name (IP address etc.)" of the child client terminal 50A transmitting the image take-in instruction and the "patient ID" of the capturing target patient corresponded to each other in the device management table T1 of the storage section 46, and the server apparatus 40 is in the state of stand-by for taking in the medical image generated in the FPD panel 1. When the image-take in instruction is received from the child client terminal 50A, the control section 41 transmits the driving instruction to instruct the FPD panel 1 to advance to the driving state through the communication section 44 (step S17).

In the FPD panel 1, when the wireless communication section 22 receives the driving instruction, the control section 19 changes to the driving state and the state is changed to a state on stand-by for irradiation of radiation from the radiation generating apparatus.

When the radiation is irradiated by the radiation generating apparatus, in the FPD panel 1, the control section 19 detects the irradiation of radiation by the radiation generating apparatus and reads the image. Specifically, in response to the irradiation of the radiation, the control section 19 starts accumulating charge for generating the image in each radiation detecting element 7, reads the charge accumulated in the radiation detecting element 7 after a predetermined amount of time passes, obtains the image signal based on the amount of radiation which passes the subject, and generates the image data. In the FPD panel 1, the control section 19 transmits the read medical image through the wireless communication section 22 to the server apparatus 40.

In the server apparatus 40, when the communication section 44 receives the medical image transmitted from the FPD panel 1 (step S18; YES), the control section 41 stores the received medical image corresponded with the patient in the storage section 46 (step S19). Specifically, the control section 41 stores the medical image transmitted from the FPD panel 1 in the storage section 46. Moreover, the client terminal name of the child client terminal 50A which instructed take-in of the image is stored in the "client terminal name" field of the image management table T2 of the storage section 46, the patient ID of the patient is stored in the "patient ID" field, the patient name of the patient is stored in the "patient name" field, and the file path showing the storage location of the medical image file is stored in the "file path" field.

The control section 41 changes the "client terminal name" field and the "patient ID" field of the device management table T1 of the storage section 46 to "NULL".

Next, the control section 41 transmits the medical image taken in from the FPD panel 1 through the communication section 44 to the child client terminal 50A (step S20).

In the child client terminal 50A, the medical image transmitted from the server apparatus 40 is displayed on the display section 53.

FIG. 15 shows an example of an image display screen 534 in a state where the medical image is displayed. In the image display screen 534, the medical image obtained from the server apparatus 40 is displayed in the image display area A6, and the OK button B6 and the NG button B7 for selecting OK or NG are displayed. The OK button B6 is a button to instruct that the medical image displayed in the image display area A6 is approved. The NG button B7 is a button to instruct that the medical image displayed in the image display area A6 is to be discarded.

In the child client terminal 50A, when the user operates the operation section 52 to select (OK or NG) whether the medical image displayed on the display section 53 is an image suitable for the diagnosis, the control section 51 transmits the selected result of OK or NG through the communication section 54 to the server apparatus 40.

In the server apparatus 40, the communication section 44 receives the selected result of OK or NG from the child client terminal 50A. When the selected result is "OK" (step S21; YES), the control section 41 approves the medical image (step S22). Specifically, the control section 41 changes the "client terminal name" field of the target record in the image management table T2 of the storage section 46 to "NULL". Hereinafter, the control section 41 releases the medical image stored in step S19 to other client terminals 50. When the image display screen of the captured patient is displayed on the display section 53 of the parent client terminal 50X, the control section 41 transmits the approved medical image through the communication section 44 to the parent client terminal 50X, and the approved medical image is displayed on the parent client terminal 50X also.

When the selected result is "NG" (step S21; NO), the control section 41 discards the medical image stored in step S19 from the storage section 46 (step S23). The control section 41 deletes the record regarding the medical image from the image management table T2 stored in the storage section 46.

In step S16, when there is no image take-in instruction in the child client terminal 50A (step S16; NO), after step S22 or step S23, the control section 41 judges whether there is an instruction to return to the patient list screen on the image display screen displayed on the display section 53 of the child client terminal 50A by the operation of the operation section 52 (step S24). Specifically, the control section 41 judges whether the return button on the image display screen is pressed on the child client terminal 50A.

When there is no instruction to return to the patient list screen (step S24; NO), the processing returns to step S16, and the processing is repeated.

In step S24, when there is the instruction to return to the patient list screen on the child client terminal 50A (step S24; YES), the processing advances to step S11 of FIG. 13.

Figure 16:
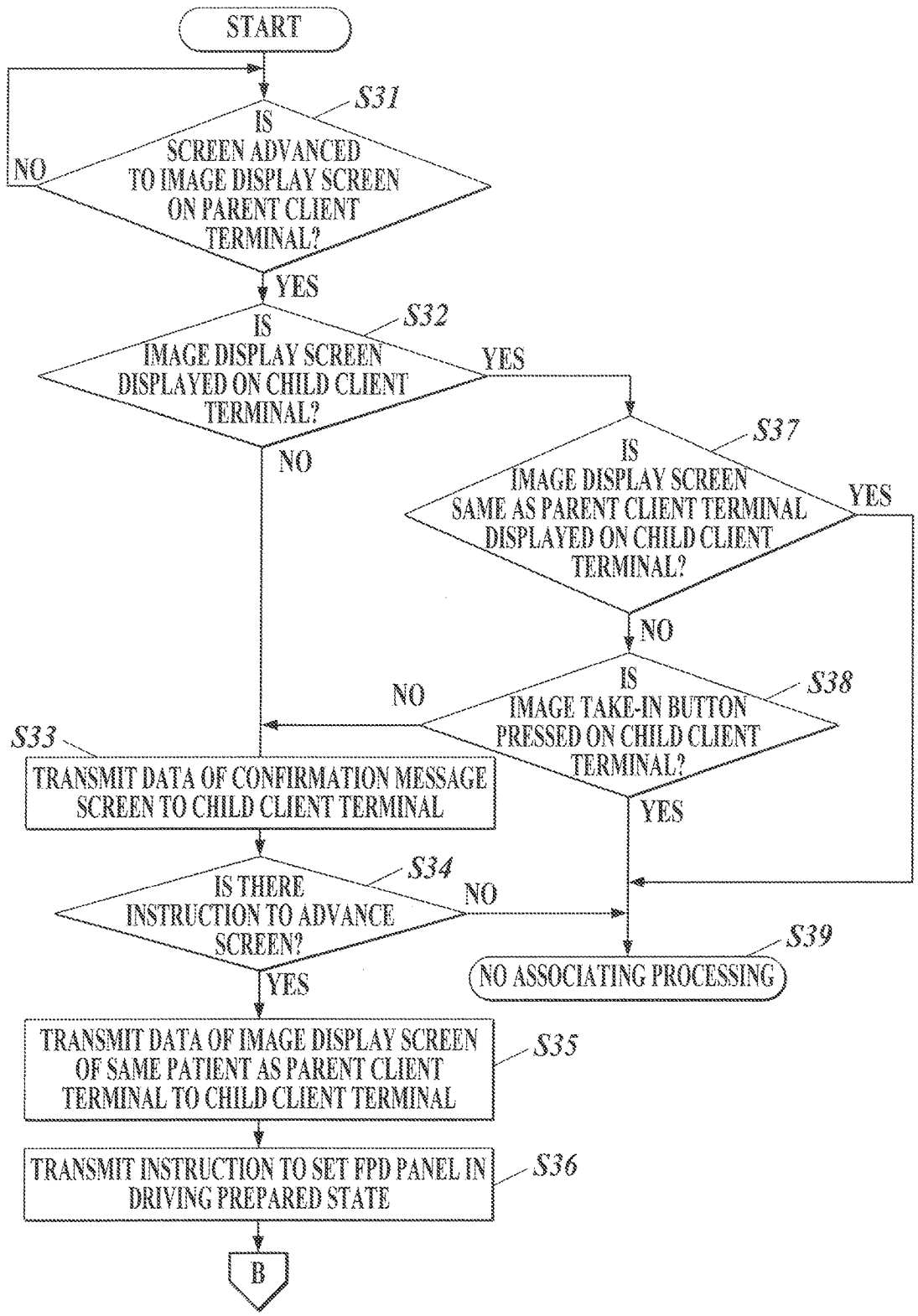
FIG. 16 is a flowchart showing processing performed on the server apparatus when the image display screen advances on the parent client terminal while a parent-child relation is established among client terminals.

With reference to FIG. 16, described below is interrupt processing in the server apparatus 40 when the screen is advanced to the image display screen on the parent client terminal 50X while the parent-child relation is established between the client terminal 50X and the client terminal 50A. The processing is realized by software processing executed by the control section 41 in coordination with the data management program P1 stored in the storage section 46.

The control section 41 judges whether the screen displayed on the display section 53 advances to the image display screen in the parent client terminal 50X (step S31). Specifically, when the patient is selected on the patient list screen in the parent client terminal 50X, the information showing the patient (patient ID, etc.) is transmitted to the server apparatus 40. In the server apparatus 40, when the information showing the patient is received from the parent client terminal 50X, the control section 41 transmits the data to display the image display screen of the patient through the communication section 44 to the parent client terminal 50X. Here, the control section 41 judges the screen is advanced to the image display screen in the parent client terminal 50X. The control section 41 stores the data to display the image display screen of the selected patient corresponded with the parent client terminal 50X in the screen management table T4.

In the parent client terminal 50X, when the screen displayed on the display section 53 advances to the image display screen (step S31; YES), the control section 41 refers to the data of the operation screen of the child client terminal 50A stored in the screen management table T4, and judges whether the image display screen is displayed on the display section 53 of the child client terminal 50A (step S32).

When the image display screen is not displayed on the display section 53 of the child client terminal 50A (step S32; NO), the control section 41 transmits the data to display a confirmation message screen through the communication section 44 to the child client terminal 50A (step S33). The confirmation message screen is a screen for confirming whether to change the display of the operation screen in the child client terminal 50A associated with the advance to the image display screen of a patient in the parent client terminal 50X.

The confirmation message screen is displayed on the display section 53 of the child client terminal 50A.

For example, the following may be displayed as the confirmation message screen, a message such as "The image display screen of a patient XX is opened on the parent client terminal. Would you like to advance the screen?" and a YES button and a NO button. The YES button is a button for instructing the operation screen of the child client terminal 50A to advance associated with the screen of the parent client terminal 50X advancing. The NO button is a button for instructing the operation screen of the child client terminal 50A to not advance associated with the screen of the parent client terminal 50X advancing.

In the child client terminal 50A, when the user operates the operation section 52 and selects whether to advance the screen associated with the screen of the parent client terminal 50X advancing (YES/NO), the control section 51 transmits the selected result of YES or NO to the server apparatus 40 through the communication section 54.

In the server apparatus 40, the communication section 44 receives the selected result of YES or NO from the child client terminal 50A. When the selected result is "YES" (step S34; YES), in other words, when there is an instruction to advance the screen, the control section 41 transmits the data to display the image display screen of the same patient as the image display screen displayed on the display section 53 of the parent client terminal 50X through the communication section 44 to the child client terminal 50A (step S35). The control section 41 stores the data to display the image display screen of the same patient as the parent client terminal 50X corresponded with the child client terminal 50A in the screen management table T4.

The image display screen of the same patient as the parent client terminal 50X is displayed on the display section 53 of the child client terminal 50A.

When the screen displayed on the display section 53 of the child client terminal 50A advances to the image display screen of the capturing target patient, the control section 41 transmits the driving preparing instruction to instruct switch to the driving prepared state to the FPD panel 1 through the communication section 44 (step S36).

In the FPD panel 1, when the wireless communication section 22 receives the driving preparing instruction, the control section 19 changes the state to the driving prepared state.

After step S36, the processing advances to step S16 shown in FIG. 14.

In step S32, when the image display screen is displayed on the display section 53 of the child client terminal 50A (step S32; YES), the control section 41 compares the data of the operation screen of the child client terminal 50A stored in the screen management table T4 of the storage section 46 with the data of the operation screen of the parent client terminal 50X, and judges whether the image display screen displayed on the display section 53 of the child client terminal 50A is the same as the image display screen displayed on the display section 53 of the parent client terminal 50X (step S37).

When the image display screen displayed on the display section 53 of the child client terminal 50A is different from the image display screen displayed on the display section 53 of the parent client terminal 50X (step S37; NO), the control section 41 judges whether the image take-in button is pressed on the image display screen displayed on the display section 53 of the child client terminal 50A (step S38).

When the image take-in button is not pressed on the image display screen displayed on the display section 53 of the child client terminal 50A (step S38; NO), the processing advances to step S33.

In step S38, when the image take-in button is pressed on the image display screen displayed on the display section 53 of the child client terminal 50A (step S38; YES), associating processing of associating the operation screen with the screen of the parent client terminal 50X advancing is not performed to prevent mistaking the images (step S39). In other words, in the child client terminal 50A, the image display screen displayed on the display section 53 is maintained.

In step S37, when the image display screen displayed on the display section 53 of the child client terminal 50A is the same as the image display screen displayed on the display section 53 of the parent client terminal 50X (step S37; YES), there is no need to match the display of the child client terminal 50A to the display of the parent client terminal 50X, and therefore the associating processing is not performed (step S39).

In step S34, when the selected result is "NO" (step S34; NO), in other words, when there is no instruction to advance the screen, the associating processing is not performed (step S39).

As described above, according to the present embodiment, based on the parent-child relation set in advance among client terminals 50, the operation screen which is displayed on the parent client terminal 50X according to certain procedures can be displayed similarly in the child client terminal 50A without following the same procedures as the parent client terminal 50X. Therefore, it is possible to enhance the operability of the client terminal 50.

For example, when the image display screen is displayed on the parent client terminal 50X provided in the examination room R1, and there is access from the child client terminal 50A provided in the capturing room R2, the image display screen of the same patient as the parent client terminal 50X is displayed on the child client terminal 50A.

Specifically, in the parent client terminal 50X provided in the diagnosis room R1, the physician inputs a user name and password on a login screen (operation U1), a patient is selected on the patient list screen (operation U2), and the physician moves to the capturing room R2 with the patient with the image display screen of the patient displayed.

In this state, when the child client terminal 50A provided in the capturing room R2 accesses to the server apparatus 40, the image display screen of the selected patient displayed on the parent client terminal 50X is displayed on the child client terminal 50A also. In other words, the operation U1 and the operation U2 are not necessary on the child client terminal 50A. The user does not have to remember the patient name, and the operation of selecting the patient again from the patient list screen of the child client terminal 50A is not necessary. Therefore, it is possible to make the flow of the operation smooth without depending on the memory of the user.

When the patient list screen is displayed on the parent client terminal 50X, and the child client terminal 50A executes access, the patient list screen is displayed on the child client terminal 50A. In other words, in the child client terminal 50A, the operation U1 is not necessary.

When the parent client terminal 50X is not logged in, and the child client terminal 50A executes access, the login screen is displayed on the child client terminal 50A.

In the parent client terminal 50X, when the screen advances to the image display screen of another patient, the operation screen of the child client terminal 50A can advance to the image display screen of the same patient as the parent client terminal 50X.

However, in order to prevent mistaking the patient, when the image take-in button is pressed on the child client terminal 50A, the screen of the child client terminal 50A does not advance. In this case, the child client terminal 50A can synchronize the screen with the parent client terminal 50X and advance the screen when the operation to return to the patient list screen is performed on the child client terminal 50A.

Moreover, it is possible to switch the state of the FPD panel 1 to the driving state right before the capturing by pressing the image take-in button on the client terminal 50A provided in the capturing room R2. Therefore, it is possible to prevent false detection due to vibration and to reduce consumption of the battery 21 in the FPD panel 1.

The description of the above embodiment is one example of the medical image capturing system of the present invention, and the present invention is not limited to the above. The detailed configuration and detailed operation of each apparatus constituting the system can be suitably changed without leaving the scope of the invention.

For example, in the present embodiment, the FPD panel 1 is set to the driving prepared state when the operation screen on the client terminal 50A provided in the capturing room R2 advances to the image display screen. Alternatively, the FPD panel 1 may be set to the driving prepared state when the operation screen on the parent client terminal 50X provided in the examination room R1 advances to the image display screen.

The above discloses an example which uses an HDD or nonvolatile memory as a computer readable medium storing the program to execute the processing, however, the present invention is not limited to the above. As other computer readable mediums, portable recording mediums such as a CD-ROM, etc. can be applied. As the medium which provides data of the program through the communication line, a carrier wave can be applied.

Although various exemplary embodiments have been shown and described, the invention is not limited to the embodiments shown. Therefore, the scope of the invention is intended to be limited solely by the scope of the claims that follow and its equivalents.

The present application is based on Japanese Patent Application No. 2012-283811 filed on Dec. 27, 2012 to the Japanese Patent Office, which shall be a basis for correcting mistranslations.

What is claimed is:

1. A medical image capturing system comprising:
    a server apparatus;
    a plurality of client terminals connected to the server apparatus to be able to communicate data; and
    an image generating apparatus connected to the server apparatus to be able to communicate data,
    wherein the server apparatus includes a storage section and a processor, the storage section storing (i) a program that is executable by the processor, and (ii) predetermined information that indicates, for each of the plurality of client terminals, a relationship between a parent client terminal and a child client terminal, and the processor executing the program to perform functions comprising:
        providing data to a client terminal among the plurality of client terminals, the data regarding an input operation screen to be displayed on the client terminal, and the input operation screen being a screen for accepting a predetermined input operation input by a user; and
        taking in a medical image generated by the image generating apparatus based on an image take-in instruction from a client terminal among the plurality of client terminals, and providing the taken-in medical image to the client terminal which instructed the take-in of the image,
    wherein, when the processor determines, based on the predetermined information stored in the server apparatus, that there is access to the server apparatus from a child client terminal among the plurality of client terminals, the processor provides data of an input operation screen, which is the same as an input operation screen presently being displayed on a parent client terminal corresponding to the child client terminal, to the child client terminal to display the input operation screen on the child client terminal and enable the user of the child client terminal to input the predetermined input operation using the input operation screen provided to and displayed on the child client terminal, and
    wherein:
        the image generating apparatus detects an irradiating timing of radiation irradiated from a radiation generating apparatus with a plurality of radiation detecting elements to generate a medical image according to irradiating of the radiation; and
        the program is executable to control the processor to perform a further function of transmitting a driving instruction to instruct the image generating apparatus to switch to a driving state when the image take-in instruction is received from the client terminal.

2. The medical image capturing system of claim 1, wherein the input operation screen is one of a login screen to login to the medical image capturing system, a patient list screen to select a capturing target patient, and an image display screen to instruct take-in of the medical image.

3. The medical image capturing system of claim 1, wherein at least one parent client terminal is assigned to a respective one child client terminal.

4. The medical image capturing system of claim 3, wherein each of the at least one parent client terminal is assigned a priority order.

5. The medical image capturing system of claim 4, wherein the priority order is used to determine the parent client terminal that corresponds to the child client terminal, from among the at least one parent client terminal assigned thereto.

6. The medical image capturing system of claim 1, wherein the predetermined input operation is one of a login operation to login to the medical image capturing system, a patient selection operation to select a capturing target patient, and an imaging instruction operation to instruct take-in of the medical image.

7. The medical image capturing system of claim 1, wherein the input operation screen provided to and displayed on the child client terminal enables the user to input a predetermined input operation of a same type as a type of the predetermined input operation accepted by the input operation screen currently being displayed on the parent client terminal.

8. The medical image capturing system of claim 1, wherein the input operation screen provided to and displayed on the child client terminal enables the user to input a next input operation in a predetermined sequence of input operations to be performed by the user, the next input operation following a preceding input operation input by the user to the input operation screen currently being displayed on the parent client terminal.

* * * * *